US008841371B2

(12) United States Patent
Nishimura et al.

(10) Patent No.: US 8,841,371 B2
(45) Date of Patent: Sep. 23, 2014

(54) VINYL CHLORIDE RESIN COMPOSITION

(75) Inventors: Hiroshi Nishimura, Saitama (JP);
Kiyotatsu Iwanami, Saitama (JP);
Kazumasa Tanaka, Saitama (JP)

(73) Assignee: Adeka Corporation, Tokyo (JP)

( * ) Notice: Subject to any disclaimer, the term of this patent is extended or adjusted under 35 U.S.C. 154(b) by 0 days.

(21) Appl. No.: 13/146,671

(22) PCT Filed: Dec. 22, 2009

(86) PCT No.: PCT/JP2009/071322
§ 371 (c)(1),
(2), (4) Date: Jul. 28, 2011

(87) PCT Pub. No.: WO2010/087093
PCT Pub. Date: Aug. 5, 2010

(65) Prior Publication Data
US 2011/0288218 A1  Nov. 24, 2011

(30) Foreign Application Priority Data
Jan. 29, 2009  (JP) .................................. 2009-018366

(51) Int. Cl.
C08L 27/06  (2006.01)
C08L 33/06  (2006.01)
C08K 5/098  (2006.01)
C08K 3/18  (2006.01)
C08K 3/24  (2006.01)

(52) U.S. Cl.
CPC ................. C08K 5/098 (2013.01); *C08L 33/06* (2013.01); *C08L 27/06* (2013.01); *C08K 2201/014* (2013.01)
USPC ............ 524/399; 524/400; 525/227; 525/239

(58) Field of Classification Search
USPC ........................... 525/227, 239; 524/399, 400
See application file for complete search history.

(56) References Cited

U.S. PATENT DOCUMENTS

| 3,867,481 | A | * | 2/1975 | Whang | ........................ 525/229 |
| 4,098,706 | A | * | 7/1978 | Boussely et al. | .............. 508/485 |
| 5,308,905 | A | | 5/1994 | Mitani et al. | |
| 5,985,959 | A | | 11/1999 | Harvey et al. | |

FOREIGN PATENT DOCUMENTS

| CN | 1091757 A | 9/1994 |
| CN | 1186822 A | 7/1998 |
| CN | 1576308 A | 2/2005 |
| EP | 2 223 970 A1 | 9/2010 |
| JP | 53-13659 A | 2/1978 |
| JP | 54-114556 A | 9/1979 |
| JP | 54112956 A * | 9/1979 |
| JP | 60-130629 A | 7/1985 |
| JP | 63-268755 A | 11/1988 |
| JP | 64-65156 A | 3/1989 |
| JP | 1-170632 A | 7/1989 |
| JP | 1-292053 A | 11/1989 |
| JP | 2-232239 A | 9/1990 |
| JP | 4-68044 A | 3/1992 |
| JP | 4-202452 A | 7/1992 |
| JP | 5-59542 A | 3/1993 |
| JP | 6-220214 A | 8/1994 |
| JP | 10-219004 A | 8/1998 |
| JP | 2004-189776 A | 7/2004 |
| JP | 2004-189777 A | 7/2004 |
| JP | 2008-214480 A | 9/2008 |
| WO | 93/24563 A | 12/1993 |
| WO | WO 2009/069491 A1 | 6/2009 |
| WO | WO 2009/090710 A1 | 7/2009 |

OTHER PUBLICATIONS

CAPlus Abstract of JP 54-112956 (May 1984, 1 page).*
Human translation of JP 54112956 (18 pages, Aug. 2013).*
International Search Report, dated Mar. 30, 2010 in PCT/JP2009/071322.
Chinese Office Action and Search Report for Chinese Application No. 200980155878.X mailed Mar. 25, 2013 with partial English translation.
Japanese Office Action dated Nov. 19, 2013 for Japanese Application No. 2009-018366 with partial English translation.
Database WPI, Thomson Scientific, London, GB, XP 002723303 Week 200939.
European Search Report for European Application No. 09839280.6 dated Apr. 24, 2014.

* cited by examiner

*Primary Examiner* — Brieann R Fink
(74) *Attorney, Agent, or Firm* — Birch, Stewart, Kolasch & Birch, LLP

(57) ABSTRACT

Provided is a vinyl chloride resin composition having superior heat resistance, colorability and processability without using a heavy metal stabilizer such as lead.
The present invention relates to a vinyl chloride resin composition which comprises, in addition to a vinyl chloride resin, (a) an organic acid calcium salt, (b) an organic acid zinc salt, (c) an organic acid potassium salt and (d) a polymer of alkyl ester of $C_4$ to $C_{10}$ acrylic acid or methacrylic acid, the polymer having a number average molecular weight of 1,000 to 4,000. Further, the present invention relates to a vinyl chloride resin composition which comprises, with respect to 100 parts by mass of the vinyl chloride resin, 0.01 to 5 parts by mass of the aforementioned component (a), 0.01 to 5 parts by mass of the aforementioned component (b), 0.001 to 1 parts by mass of the aforementioned component (c) and 0.05 to 10 parts by mass of the aforementioned component (d).

7 Claims, No Drawings

VINYL CHLORIDE RESIN COMPOSITION

TECHNICAL FIELD

The present invention relates to a vinyl chloride resin composition. Particularly, the present invention relates to a vinyl chloride resin composition having superior heat resistance, colorability and processability, which consists of a combination of specific organic acid metal salts and a polymer of alkyl ester of acrylic acid or methacrylic acid.

BACKGROUND ART

Chlorine-containing resins such as vinyl chloride resins are used in a variety of applications because, for example, they have superior flame retardancy and chemical resistance. However, chlorine-containing resins have a drawback in that, in thermal processing or the like, a part of the carbon-chlorine bond is thermally broken to cause dehydrochlorination which results in a reduced mechanical strength and occurrence of coloring, thereby impairing the marketability of the resin.

In order to solve the above-described drawback, a variety of stabilizers have been developed, and thereamong, particularly, mixtures and the like of a lead or cadmium compound and a barium compound have been known to have superior stabilizing effect. However, in recent years, the trend is toward restricting the use of lead compounds and cadmium compounds from the safety standpoint, so that such stabilizers using a lead or cadmium compound are now being replaced by those in which a highly safe zinc compound is used in combination with an organic acid salt of alkaline earth metal or an inorganic compound such as hydrotalcite or zeolite.

Since these low toxic stabilizers by themselves cannot provide sufficient stabilizing effect, in order to improve the resistance to light, heat, oxidation and the like, a variety of additives, such as organic phosphite compounds, epoxy compounds, phenol-based antioxidants, benzophenone-based or benzotriazole-based ultraviolet absorbers and hindered amine-based light stabilizers, are used in combination.

However, it is still difficult to attain sufficient improvement in the heat resistance even with the use of these non-metallic stabilizing aids in combination, and there is also a room for improvement in terms of the processability of resin compositions.

Patent Document 1 discloses a vinyl chloride resin composition in which a polyester-based plasticizer, a non-ionic surfactant and a polymer of alkyl ester of acrylic acid or methacrylic acid, the polymer having a number average polymerization degree of 50, are added to a vinyl chloride resin.

RELATED ART DOCUMENTS

Patent Document

Patent Document 1: Japanese Unexamined Patent Application Publication No. H5-59242

SUMMARY OF THE INVENTION

Problems to be Solved by the Invention

However, the composition concretely proposed in the aforementioned Patent Document 1 could not provide sufficient performance in terms of the heat resistance, colorability and processability.

Therefore, an object of the present invention is to provide a vinyl chloride resin composition having superior heat resistance, colorability and processability without using a heavy metal stabilizer such as lead.

Means for Solving the Problems

In order to solve the aforementioned problem, the present inventors intensively studied to discover that the aforementioned object can be achieved by, in a system which does not use a foaming agent, combining an organic acid calcium salt, an organic acid zinc salt, an organic acid potassium salt and a polymer of specific acid alkyl ester(meth)acrylate with a vinyl chloride resin, thereby completing the present invention.

That is, the vinyl chloride resin composition according to the present invention comprises, in addition to a vinyl chloride resin, (a) an organic acid calcium salt, (b) an organic acid zinc salt, (c) an organic acid potassium salt and (d) a polymer of alkyl ester of $C_4$ to $C_{10}$ acrylic acid or methacrylic acid, the polymer having a number average molecular weight of 1,000 to 4,000.

In addition, it is preferred that the vinyl chloride resin composition according to the present invention comprises, with respect to 100 parts by mass of the vinyl chloride resin, (a) 0.01 to 5 parts by mass of the organic acid calcium salt, (b) 0.01 to 5 parts by mass of the organic acid zinc salt, (c) 0.001 to 1 parts by mass of the organic acid potassium salt and (d) 0.05 to 10 parts by mass of the polymer of alkyl ester of $C_4$ to $C_{10}$ acrylic acid or methacrylic acid, the polymer having a number average molecular weight of 1,000 to 4,000.

Further, in the present invention, it is preferred that the molar ratio of the aforementioned component (a) and the aforementioned component (b) be (a)/(b)=1/1 to 10/1 and that the amount of the aforementioned component (c) to be used be 0.01 to 0.3 mol with respect to a total amount of 1 mol of the aforementioned components (a) and (b).

Still further, it is preferred that the aforementioned component (d) be a 2-ethylhexyl ester oligomer of acrylic acid or methacrylic acid, the acrylic acid ester oligomer having a number average molecular weight of 1,500 to 2,500; that the aforementioned component (a) be a carboxylic acid calcium salt; that the aforementioned component (b) be a carboxylic acid zinc salt; and that the aforementioned component (c) be a carboxylic acid potassium salt.

Effects of the Invention

By the present invention, a vinyl chloride resin composition having superior thermal stability, colorability and processability, as well as a vehicle's leather, a sheet and a general-purpose vinyl chloride resin composition product, can be provided.

MODE FOR CARRYING OUT THE INVENTION

The vinyl chloride resin composition according to the present invention will now be explained in detail.

The polymerization method of the vinyl chloride resin used in the present invention is not particularly restricted and it is produced by bulk polymerization, solution polymerization, suspension polymerization, emulsion polymerization or the like. Examples of the vinyl chloride resin used in the present invention include vinyl chloride-based resins such as polyvinyl chloride, chlorinated polyvinyl chloride, polyvinylidene chloride, chlorinated polyethylene, vinyl chloride-vinyl acetate copolymers, vinyl chloride-ethylene copolymers, vinyl chloride-propylene copolymers, vinyl chloride-styrene copolymers, vinyl chloride-isobutylene copolymers, vinyl chloride-vinylidene chloride copolymers, vinyl chloride-styrene-maleic anhydride ternary copolymers, vinyl chloride-styrene-acrylonitrile copolymers, vinyl chloride-butadiene copolymers, vinyl chloride-isoprene copolymers, vinyl chloride-chlorinated propylene copolymers, vinyl chloride-vinylidene chloride-vinyl acetate ternary copolymers, vinyl chloride-maleic acid ester copolymers, vinyl chloride-methacrylic acid ester copolymers, vinyl chloride-acrylonitrile copolymers, copolymers of vinyl chloride and various vinyl ethers; and blend products of these resins with each other or blend products, block copolymers, graft copolymers and the like of these resins with other chlorine-free synthetic resins such as acrylonitrile-styrene copolymer, acrylonitrile-butadiene-styrene copolymer, ethylene-vinyl acetate copolymer, ethylene-ethyl(meth)acrylate copolymer and polyester.

Examples of the organic acid calcium salt used as the component (a) in the present invention include calcium salts of organic carboxylic acids, phenols and organophosphates.

Examples of the aforementioned organic carboxylic acids include monocarboxylic acids such as acetic acid, propionic acid, butyric acid, valeric acid, caproic acid, enanthic acid, caprylic acid, pelargonic acid, 2-ethylhexanoic acid, neodecanoic acid, capric acid, undecanoic acid, lauric acid, tridecanoic acid, myristic acid, palmitic acid, isostearic acid, stearic acid, 1,2-hydroxystearate, behenic acid, montanoic acid, benzoic acid, monochlorobenzoic acid, p-tert-butyl benzoic acid, dimethylhydroxy benzoic acid, 3,5-di-tert-butyl-4-hydroxy benzoic acid, toluic acid, dimethyl benzoic acid, ethyl benzoic acid, cuminic acid, n-propyl benzoic acid, aminobenzoic acid, N,N-dimethylamino benzoic acid, acetoxy benzoic acid, salicylic acid, p-tert-octyl salicylic acid, elaidic acid, oleic acid, linoleic acid, linolenic acid, thioglycolic acid, mercaptopropionic acid and octyl mercaptopropionic acid; dicarboxylic acids such as oxalic acid, malonic acid, succinic acid, glutaric acid, adipic acid, pimelic acid, suberic acid, azelaic acid, sebacic acid, phthalic acid, isophthalic acid, terephthalic acid, hydroxy phthalic acid, chlorophthalic acid, amino phthalic acid, maleic acid, fumaric acid, citraconic acid, methaconic acid, itaconic acid, aconitic acid and thiodipropionic acid, or monoester or monoamide compounds of these dicarboxylic acids; and tri- or tetra-carboxylic acids such as butane tricarboxylic acid, butane tetracarboxylic acid, hemimellitic acid, trimellitic acid, mellophanic acid and pyromellitic acid, or di- or tri-ester compounds of these tri- or tetra-carboxylic acids.

Examples of the aforementioned phenols include tert-butylphenol, nonylphenol, dinonyl phenol, cyclohexylphenol, phenylphenol, octylphenol, phenol, cresol, xylenol, n-butylphenol, isoamylphenol, ethylphenol, isopropylphenol, isooctylphenol, 2-ethylhexylphenol, tert-nonylphenol, decylphenol, tert-octylphenol, isohexylphenol, octadecylphenol, diisobutylphenol, methyl propyl phenol, diamylphenol, methyl isohexyl phenol and methyl-tert-octyl phenol.

Further, examples of the aforementioned organophosphates include mono- or di-octyl phosphate, mono- or di-dodecyl phosphate, mono- or di-octadecyl phosphate, mono- or di-(nonylphenyl) phosphate, nonylphenyl phosphonate and stearyl phosphonate.

Further, the aforementioned calcium salts of organic carboxylic acids, phenols and organophosphates may also be an acid salt, neutral salt, basic salt or perbasic complex which is obtained by neutralizing a part or the entire base of a basic salt with carbonic acid.

The amount of the aforementioned organic acid calcium salt to be added is, with respect to 100 parts by mass of the vinyl chloride resin, preferably 0.01 to 5 parts by mass, more preferably 0.05 to 3 parts by mass.

Examples of the organic acid zinc salt used as the component (b) in the present invention include zinc salts of organic carboxylic acids, phenols and organophosphates. Examples of the organic carboxylic acids, phenols and organophosphates include those described in the above.

Further, the aforementioned zinc salts of organic carboxylic acids, phenols and organophosphates may also be an acid salt, neutral salt, basic salt or perbasic complex which is obtained by neutralizing a part or the entire base of a basic salt with carbonic acid.

The amount of the aforementioned organic acid zinc salt to be added is, with respect to 100 parts by mass of the vinyl chloride resin, preferably 0.01 to 5 parts by mass, more preferably 0.05 to 3 parts by mass.

Examples of the organic acid potassium salt used as the component (c) in the present invention include potassium salts of organic carboxylic acids, phenols and organophosphates. Examples of the organic carboxylic acids, phenols and organophosphates include those described in the above.

Further, the aforementioned potassium salts of organic carboxylic acids, phenols and organophosphates may also be an acid salt, neutral salt, basic salt or perbasic complex which is obtained by neutralizing a part or the entire base of a basic salt with carbonic acid.

The amount of the aforementioned organic acid potassium salt to be added is, with respect to 100 parts by mass of the vinyl chloride resin, preferably 0.001 to 1 parts by mass, more preferably 0.01 to 0.5 parts by mass.

It is preferred that the amounts of the component (a), component (b) and component (c) used in the present invention satisfy the following conditions since it allows production of a non-foaming molded article having superior colorability and thermal stability. The conditions are that the use ratio of the component (a) and component (b) is, in terms of the molar ratio, (a)/(b)=1/1 to 10/1, particularly preferably 2/1 to 8/1; and that the amount of the component (c) to be used is, with respect to a total amount of 1 mol of the components (a) and (b), 0.01 to 0.3 mol, particularly preferably 0.05 to 0.25 mol.

The polymer used as the component (d) in the present invention can be obtained by polymerizing, for example, butyl(meth)acrylate, amyl(meth)acrylate, hexyl(meth)acrylate, heptyl(meth)acrylate, octyl(meth)acrylate, nonyl(meth)acrylate or decyl(meth)acrylate in accordance with a conventional method, and the polymer has a number average molecular weight of 1,000 to 4,000. Further, a telomer using cymene, pseudocumene or the like may also be used. Especially, an acrylic acid ester oligomer of 2-ethylhexyl ester of acrylic acid or methacrylic acid, which oligomer has a number average molecular weight of 1,500 to 2,500, is preferably used since it yields a resin composition having superior processability.

The amount of the polymer to be used as the aforementioned component (d) is, with respect to 100 parts by mass of the vinyl chloride resin, 0.05 to 10 parts by mass, preferably 0.1 to 5 parts by mass. At an amount of less than 0.05 parts by mass, sufficient effect is not exhibited, and not only is an amount of over 10 parts by mass wasteful, but also it may adversely affect the physical properties or the like of the resin composition; therefore, such amounts are not preferred.

Further, in the composition according to the present invention, other additive(s) commonly used in a vinyl chloride resin composition may be added, and examples of such additives include plasticizers, hydrotalcite compounds, zeolite compounds, β-diketone compounds, perchlorates, epoxy compounds, polyalcohols, phosphorus-based, phenol-based and sulfur-based antioxidants, ultraviolet absorbers, hindered amine-based light stabilizers, fillers and lubricants.

Examples of the aforementioned plasticizers include phthalate-based plasticizers such as dibutyl phthalate, butylhexyl phthalate, diheptyl phthalate, dioctyl phthalate, diisononyl phthalate, diisodecyl phthalate, dilauryl phthalate, dicyclohexyl phthalate and dioctyl terephthalate; adipate-based plasticizers such as dioctyl adipate, diisononyl adipate, diisodecyl adipate and di(butyl diglycol)adipate; phosphate-based plasticizers such as triphenyl phosphate, tricresyl phosphate, trixylenyl phosphate, tri(isopropylphenyl)phosphate, triethyl phosphate, tributyl phosphate, trioctyl phosphate, tri(butoxyethyl)phosphate and octyldiphenyl phosphate; polyester-based plasticizers in which ethylene glycol, diethylene glycol, triethylene glycol, 1,2-propylene glycol, 1,3-propylene glycol, 1,3-butanediol, 1,4-butanediol, 1,5-hexanediol, 1,6-hexanediol, neopentyl glycol or the like is used as polyalcohol, oxalic acid, malonic acid, succinic acid, glutaric acid, adipic acid, pimelic acid, suberic acid, azelaic acid, sebacic acid, phthalic acid, isophthalic acid, terephthalic acid or the like is used as dibasic acid, and as required, monohydric alcohol or monocarboxylic acid is used as a stopper; and other plasticizers such as tetrahydrophthalic acid-based plasticizers, azelaic acid-based plasticizers, sebacic acid-based plasticizers, stearic acid-based plasticizers, citric acid-based plasticizers, trimellitic acid-based plasticizers, pyromellitic acid-based plasticizers, biphenyl tetracarboxylic acid ester-based plasticizers and chlorine-based plasticizers.

The aforementioned hydrotalcite compound is a carboxylic acid double salt compound of magnesium and/or zinc and aluminum, preferably a compound represented by the Formula (I) below.

[Formula 1]

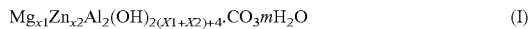

$$Mg_{x1}Zn_{x2}Al_2(OH)_{2(x1+x2)+4} \cdot CO_3 m H_2O \quad (I)$$

(wherein, x1 and x2 each represent a number satisfying the conditions shown by the following equations and m represents a real number: $0 \leq x2/x1 < 10$, $2 \leq x1+x2 < 20$)

The aforementioned hydrotalcite compound may be a naturally-occurring one or a synthetic product. Examples of the method of synthesizing the aforementioned synthetic product include those known methods described in, for example, JP 46-2280B, JP 50-30039B, JP 51-29129B and Japanese Unexamined Patent Application Publication No. S61-174270. Further, in the present invention, the aforementioned hydrotalcite compound can be used without any restriction on the presence or absence of crystal structure, crystal grain system or crystal water, and the amount thereof.

Further, the surface of the aforementioned perchloric acid-treated hydrotalcite to be used may be coated with a higher fatty acid such as stearic acid, a higher fatty acid metal salt such as alkali metal oleate, an organic sulfonic acid metal salt such as alkali metal dodecylbenzene sulfonate, a higher fatty acid amide, a higher fatty acid ester, a wax or the like.

The aforementioned zeolite compounds is alkali or alkaline earth metal aluminosilicate having a unique three-dimensional zeolite crystal structure, and representative examples thereof include A-type, X-type, Y-type and P-type zeolites, monodenite, analcite, sodalite-family aluminosilicates, clinoptilolite, erionite and chabazite. These zeolite compounds may be either a hydrate having crystal water (so-called zeolite water) or an anhydride in which the crystal water is removed.

Further, zeolites having a particle diameter of 0.1 to 50 μm may be used and those having a particle diameter of 0.5 to 10 μm are particularly preferred.

Examples of the aforementioned β-diketone compounds include dehydroacetic acid, dibenzoylmethane, palmitoylbenzoylmethane and stearoylbenzoylmethane, and metal salts of these compounds are also equally useful.

Examples of the aforementioned perchlorates include metal salts of perchloric acid, ammonium perchlorates, perchloric acid-treated hydrotalcites and perchloric acid-treated silicates. Here, examples of metals constituting the metal salts include lithium, sodium, potassium, calcium, magnesium, strontium, barium, zinc, cadmium, lead and aluminum. The aforementioned metal salts of perchloric acid may be an anhydride or a hydrate salt. The aforementioned metal salts of perchloric acid may also be dissolved in an alcohol-based or ester-based solvent such as butyl diglycol or butyl diglycol adipate, or may be a dehydrate thereof.

Examples of the aforementioned epoxy compounds include bisphenol-type and novolak-type epoxy resins, epoxidized soybean oil, epoxidized linseed oil, epoxidized tung oil, epoxidized fish oil, epoxidized beef tallow oil, epoxidized castor oil, epoxidized safflower oil, epoxidized tall oil fatty acid octyl, epoxidized linseed oil fatty acid butyl, ethyl epoxystearate, butyl epoxystearate, 2-ethylhexyl epoxystearate, stearyl epoxystearate, tris(epoxypropyl)isocyanurate, 3-(2-xenoxy)-1,2-epoxypropane, epoxidized polybutadiene, bisphenol A diglycidyl ether, vinylcyclohexene diepoxide, dicyclopentadiene diepoxide, 3,4-epoxycyclohexyl-6-methylepoxycyclohexane carboxylate and bis(3,4-epoxycyclohexyl)adipate.

Examples of the aforementioned polyalcohols include pentaerythritol, dipentaerythritol, sorbitol, mannitol, trimethylolpropane, ditrimethylolpropane, stearic acid partial ester of pentaerythritol or dipentaerythritol, bis(dipentaerythritol)adipate, glycerin, diglycerin, and tris(2-hydroxyethyl) isocyanurate.

Examples of the aforementioned phosphorous-based antioxidant include triphenyl phosphite, tris(2,4-di-tert-butylphenyl)phosphite, tris(nonylphenyl)phosphite, tris(dinonylphenyl)phosphite, tris(mono-, di-mixed nonylphenyl) phosphite, bis(2-tert-butyl-4,6-dimethylphenyl).ethyl phosphite, diphenyl acid phosphite, 2,2'-methylenebis(4,6-di-tert-butylphenyl)octyl phosphite, diphenyldecyl phosphite, phenyldiisodecyl phosphite, tributyl phosphite, tris(2-ethylhexyl)phosphite, tridecyl phosphite, trilauryl phosphite, dibutyl acid phosphite, dilauryl acid phosphite, trilauryl trithiophosphite, bis(neopentyl glycol).1,4-cyclohexane dimethyl diphosphite, bis(2,4-di-tert-butylphenyl)pentaerythritol diphosphite, bis(2,6-di-tert-butyl-4-methylphenyl)pentaerythritol diphosphite, distearyl pentaerythritol diphosphite, tetra(C12-15 mixed alkyl)-4,4'-isopropylidene diphenylphosphite, bis[2,2'-methylenebis(4,6-diamylphenyl)].isopropylidene diphenylphosphite, hydrogenated-4,4'-isopropylidene diphenol polyphosphite, tetra(tridecyl).4,4'-butylidene-bis(2-tert-butyl-5-methylphenol)diphosphite, hexa(tridecyl).1,1,3-tris(2-methyl-5-tert-butyl-4-hydroxyphenyl)butane.triphosphonite, 9,10-dihydro-9-oxa-10-phosphaphenanthrene-10-oxide and 2-butyl-2-ethylpropanediol-2,4,6-tri-tert-butylphenol monophosphite.

Examples of the aforementioned phenol-based antioxidants include 2,6-di-tert-butyl-p-cresol, 2,6-diphenyl-4-octadecyloxyphenol, stearyl(3,5-di-tert-butyl-4-hydroxyphenyl)-propionate, distearyl(3,5-di-tert-butyl-4-hydroxybenzyl)phosphonate, thiodiethylene glycol-bis[(3,5-di-tert-butyl-4-hydroxyphenyl)propionate], 1,6-hexamethylenebis[(3,5-di-tert-butyl-4-hydroxyphenyl) propionate], 1,6-hexamethylenebis[(3,5-di-tert-butyl-4- hydroxyphenyl)propionic acid amide], 4,4'-thiobis(6-tert-butyl-m-cresol), 2,2'-methylenebis(4-methyl-6-tert-butylphenol), 2,2'-methylenebis(4-ethyl-6-tert-butylphenol), bis[3,3-bis(4-hydroxy-3-tert-butylphenyl)butylic acid]glycol ester, 4,4'-butylidene-bis(6-tert-butyl-m-cresol), 2,2'-ethylidene-bis(4,6-di-tert-butylphenol), 2,2'-ethylidene-bis(4-sec-butyl-6-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyloxyethyl]isocyanurate, tetrakis[methylene-3-(3,5-di-tert-butyl-4-hydroxyphenyl)propionate]methane, 2-tert-butyl-4-methyl-6-(2-acryloyloxy-3-tert-butyl-5-methylbenzyl)phenol, 3,9-bis[1,1-dimethyl-2-{(3-tert-butyl-4-hydroxy-5-methylphenyl)propionyloxy}ethyl]-2,4,8,10-tetraoxaspiro[5.5]undecane and triethylene glycol-bis[(3-tert-butyl-4-hydroxy-5-methylphenyl)propionate].

Examples of the aforementioned sulfur-based antioxidants include dialkyl thiodipropionates such as dilauryl, dimyristyl and distearyl thiodipropionates; and β-alkylmercapto propionic acid esters of polyols such as pentaerythritol tetra(β-dodecylmercaptopropionate).

Examples of the aforementioned ultraviolet absorbers include 2-hydroxybenzophenones such as 2,4-dihydroxybenzophenone, 2-hydroxy-4-methoxybenzophenone, 2-hydroxy-4-octoxybenzophenone and 5,5'-methylenebis(2-hydroxy-4-methoxybenzophenone); 2-(2'-hydroxyphenyl)benzotriazoles such as 2-(2'-hydroxy-5'-methylphenyl)benzotriazole, 2-(2'-hydroxy-3',5'-di-tert-butylphenyl)benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-5'-tert-octylphenyl)benzotriazole, 2-(2'-hydroxy-3',5'-dicumylphenyl)benzotriazole and 2,2'-methylenebis(4-tert-octyl-6-benzotriazolyl)phenol; benzoates such as phenyl salicylate, resorcinol monobenzoate, 2,4-di-tert-butylphenyl-3',5'-di-tert-butyl-4'-hydroxybenzoate and hexadecyl-3,5-di-tert-butyl-4-hydroxybenzoate; substituted oxanilides such as 2-ethyl-2'-ethoxyoxanilide and 2-ethoxy-4'-dodecyloxanilide; and cyanoacrylates such as ethyl-α-cyano-β,β-diphenyl acrylate and methyl-2-cyano-3-methyl-3-(p-methoxyphenyl)acrylate.

Examples of the aforementioned hindered amine-based light stabilizers include 2,2,6,6-tetramethyl-4-piperidyl stearate, 1,2,2,6,6-pentamethyl-4-piperidyl stearate, 2,2,6,6-tetramethyl-4-piperidylbenzoate, N-(2,2,6,6-tetramethyl-4-piperidyl)dodecyl succinimide, 1-[(3,5-di-tert-butyl-4-hydroxyphenyl)propionyloxyethyl]-2,2,6,6-tetramethyl-4-piperidyl-(3,5-di-tert-butyl-4-hydroxyphenyl)propionate, bis(2,2,6,6-tetramethyl-4-piperidyl)sebacate, bis(1,2,2,6,6-pentamethyl-4-piperidyl)sebacate, bis(1,2,2,6,6-pentamethyl-4-piperidyl)-2-butyl-2-(3,5-di-tert-butyl-4-hydroxybenzyl)malonate, N,N'-bis(2,2,6,6-tetramethyl-4-piperidyl)hexamethylenediamine, tetra(2,2,6,6-tetramethyl-4-piperidyl)butane tetracarboxylate, tetra(1,2,2,6,6-pentamethyl-4-piperidyl)butane tetracarboxylate, bis(2,2,6,6-tetramethyl-4-piperidyl).di(tridecyl)butane tetracarboxylate, bis(1,2,2,6,6-pentamethyl-4-piperidyl).di(tridecyl)butane tetracarboxylate, 3,9-bis[1,1-dimethyl-2-{tris(2,2,6,6-tetramethyl-4-piperidyloxycarbonyloxy)butylcarbonyloxy}ethyl]-2,4,8,10-tetraoxaspiro[5.5]undecane, 3,9-bis[1,1-dimethyl-2-{tris(1,2,2,6,6-pentamethyl-4-piperidyloxycarbonyloxy)butylcarbonyloxy}ethyl]-2,4,8,10-tetraoxaspiro[5.5]undecane, 1,5,8,12-tetrakis[4,6-bis{N-(2,2,6,6-tetramethyl-4-piperidyl)butylamino}-1,3,5-triazine-2-yl]-1,5,8,12-tetraazadodecane, 1-(2-hydroxyethyl)-2,2,6,6-tetramethyl-4-piperidinol/diethyl succinate condensate, 2-tert-octylamino-4,6-dichloro-s-triazine/N,N'-bis(2,2,6,6-tetramethyl-4-piperidyl)hexamethylenediamine condensate and N,N'-bis(2,2,6,6-tetramethyl-4-piperidyl)hexamethylenediamine/dibromoethane condensate.

Examples of the aforementioned fillers include calcium carbonate, silica, clay, glass beads, mica, sericite, glass flakes, asbestos, wollastonite, potassium titanate, PMF, gypsum fibers, xonotlite, MOS, phosphate fibers, glass fibers, carbonate fibers and aramid fibers.

Examples of the aforementioned lubricants include hydrocarbons such as natural paraffin and low molecular weight polyethylene; fatty acids such as stearic acid, lauric acid and erucic acid; aliphatic alcohols such as cetyl alcohol and stearyl alcohol; fatty acid amides such as stearamide and methylene-bis-stearamide; lower alcohol esters of fatty acids such as butyl stearate; and higher alcohol esters of higher fatty acids such as glycerol monostearate.

In addition, in the composition according to the present invention, additive(s) commonly used in a vinyl chloride resin composition, for example, a cross-linking agent, antistatic agent, anti-clouding agent, anti-plateout agent, surface treatment agent, flame retardant, fluorescent agent, antifungal agent, sterilizer, metal inactivator, mold release agent, processing aid, antioxidant and/or light stabilizer, may be blended.

Further, the composition according to the present invention can be used independently of the processing method of the vinyl chloride resin. For example, the composition according to the present invention may be suitably used in processes such as calendering processing, roll processing, extrusion molding, melt-rolling, injection molding, pressure molding, paste processing, powder molding and foam molding.

The composition according to the present invention can be used in building materials such as wall materials, floor materials, window frames, corrugated panels and rain gutters; automotive interior and exterior materials; fish and food packaging materials such as trays; and miscellaneous goods such as packings, gaskets, hoses, pipes, joints, sheets and toys.

EXAMPLES

The present invention will now be described in more detail by way of examples; however, the present invention is not limited thereto.

Example 1

The formulation below was calendered at 170° C. for 5 minutes. A 0.7-mm sheet was removed and placed in a Geer oven at 190° C. to measure the degradation time (thermal stability, minutes). Also, the thus obtained sheets were laminated and press-worked at 180° C. for 5 or 30 minutes to prepare 1-mm sheets, and the yellowness of each sheet was measured. Furthermore, the following formulation was calendered at 170° C. and the adhesion time (mill adhesion time, minutes) of the resultant was measured.

The results of the measurements are shown in [Table 1] below.

| (Formulation) | parts by mass |
|---|---|
| Vinyl chloride resin | 100 |
| Di-2-ethylhexyl phthalate | 40 |
| Epoxidized soybean oil | 2 |
| Diundecyl monophenyl phosphite | 0.7 |
| 4-hydroxy-3,5-di-tert-butylphenyl propionate | 0.1 |
| Dibenzoylmethane | 0.1 |

TABLE 1

| | Test compound | | Examples | | Comparative Examples | | | | |
|---|---|---|---|---|---|---|---|---|---|
| | | | 1-1 | 1-2 | 1-1 | 1-2 | 1-3 | 1-4 | 1-5 |
| Test Compounds | Ca-st*[1] | | 0.46 | — | 0.46 | 0.46 | — | 0.46 | — |
| | Ca-Oct*[2] | | — | 0.46 | — | — | 0.46 | 0.03 | — |
| | Zn-st*[3] | | 0.1 | — | 0.1 | 0.1 | — | 0.1 | — |
| | Zn-Oct*[4] | | — | 0.1 | — | — | 0.1 | — | 0.1 |
| | K-Oct*[5] | | 0.03 | 0.03 | 0.03 | — | — | — | 0.03 |
| | Ac-2EH*[6] | | 0.5 | 0.5 | — | 0.5 | 0.5 | 0.5 | 0.5 |
| Molar Contents | Ca Content (mmol) | | 1.40 | 2.51 | 1.40 | 1.40 | 2.51 | 1.76 | — |
| | Zn Content (mmol) | | 0.28 | 0.48 | 0.28 | 0.28 | 0.48 | 0.48 | 0.48 |
| | K Content (mmol) | | 0.16 | 0.16 | 0.16 | — | — | — | 0.16 |
| Evaluation Results | Thermal stability (minutes) | | 75 | 75 | 75 | 60 | 60 | 60 | 30 |
| | Yellowness | 180° C. × 5 minutes | 7.9 | 7.3 | 8.1 | 8.3 | 8.1 | 8.3 | 17.4 |
| | | 180° C. × 30 minutes | 28.0 | 26.1 | 28.5 | 32.4 | 29.6 | 32.1 | 46.9 |
| | Mill adhesion (minutes) | | 40 | 37 | 32 | 32 | 28 | 31 | 20 |

*[1]Calcium stearate
*[2]Calcium octylate
*[3]Zinc stearate
*[4]Zinc octylate
*[5]Potassium octylate
*[6]Acrylic acid ester oligomer of 2-ethylhexyl acrylate, which has a number average molecular weight of 2,000

As clearly seen from the above Examples, when an organic acid calcium, an organic acid zinc and a small amount of organic acid potassium were used in combination without using the acrylic acid ester oligomer of 2-ethylhexyl acrylate (Comparative Example 1-1), although superior effect was attained in terms of the thermal stability, the mill adhesion (processability) was not sufficient. In addition, even when the acrylic acid ester oligomer of 2-ethylhexyl acrylate was used, in cases where only an organic acid calcium and an organic acid zinc were used in combination (Comparative Examples 1-2 and 1-3), the thermal stability and the mill adhesion (heat resistance) were not sufficient, and no changes were observed also when a small amount of calcium octylate was added to this combination of calcium stearate and zinc stearate (Comparative Example 1-4). Furthermore, when an organic acid zinc and an organic acid potassium were used in combination (Comparative Example 1-5), both of the heat resistance and colorability were markedly inferior.

In contrast, when the acrylic acid ester oligomer of 2-ethylhexyl acrylate was used and a small amount of organic acid potassium was added to a combination of an organic acid calcium and organic acid zinc (Examples 1-1 and 1-2), a remarkable effect to improve the thermal stability and mill adhesion (processability) was observed and there was also observed an improvement in the yellowness (colorability).

The invention claimed is:

1. A vinyl chloride resin composition, comprising, in addition to a vinyl chloride resin, (a) an organic acid calcium salt, (b) an organic acid zinc salt, (c) an organic acid potassium salt and (d) an acrylic acid oligomer of 2-ethylhexyl ester of acrylic acid or methacrylic acid, said oligomer having a number average molecular weight of 1,000 to 4,000.

2. The vinyl chloride resin composition according to claim 1, wherein said vinyl chloride resin composition comprises, with respect to 100 parts by mass of said vinyl chloride resin, 0.01 to 0.5 parts by mass of said component (a), 0.01 to 5 parts by mass of said component (b), 0.001 to 1 parts by mass of said component (c) and 0.05 to 10 parts by mass of said component (d).

3. The vinyl chloride resin composition according to claim 1, wherein the molar ratio of said component (a) and said component (b) is (a)/(b)=1/1 to 10/1.

4. The vinyl chloride resin composition according to claim 1, wherein the amount of said component (c) used is 0.01 to 0.3 mol with respect to a total amount of 1 mol of said components (a) and (b).

5. The vinyl chloride resin composition according to claim 1, wherein said component (d) is a 2-ethylhexyl ester oligomer of acrylic acid or methacrylic acid, said ester oligomer having a number average molecular weight of 1,500 to 2,500.

6. The vinyl chloride resin composition according to claim 1, wherein said component (a) is a carboxylic acid calcium salt, said component (b) is a carboxylic acid zinc salt and said component (c) is a carboxylic acid potassium salt.

7. The vinyl chloride resin composition according to claim 1, wherein said vinyl chloride resin composition does not have a heavy metal stabilizer.

* * * * *